Nov. 24, 1942.   H. THOMASON   2,303,007
GAUGE
Filed July 15, 1940
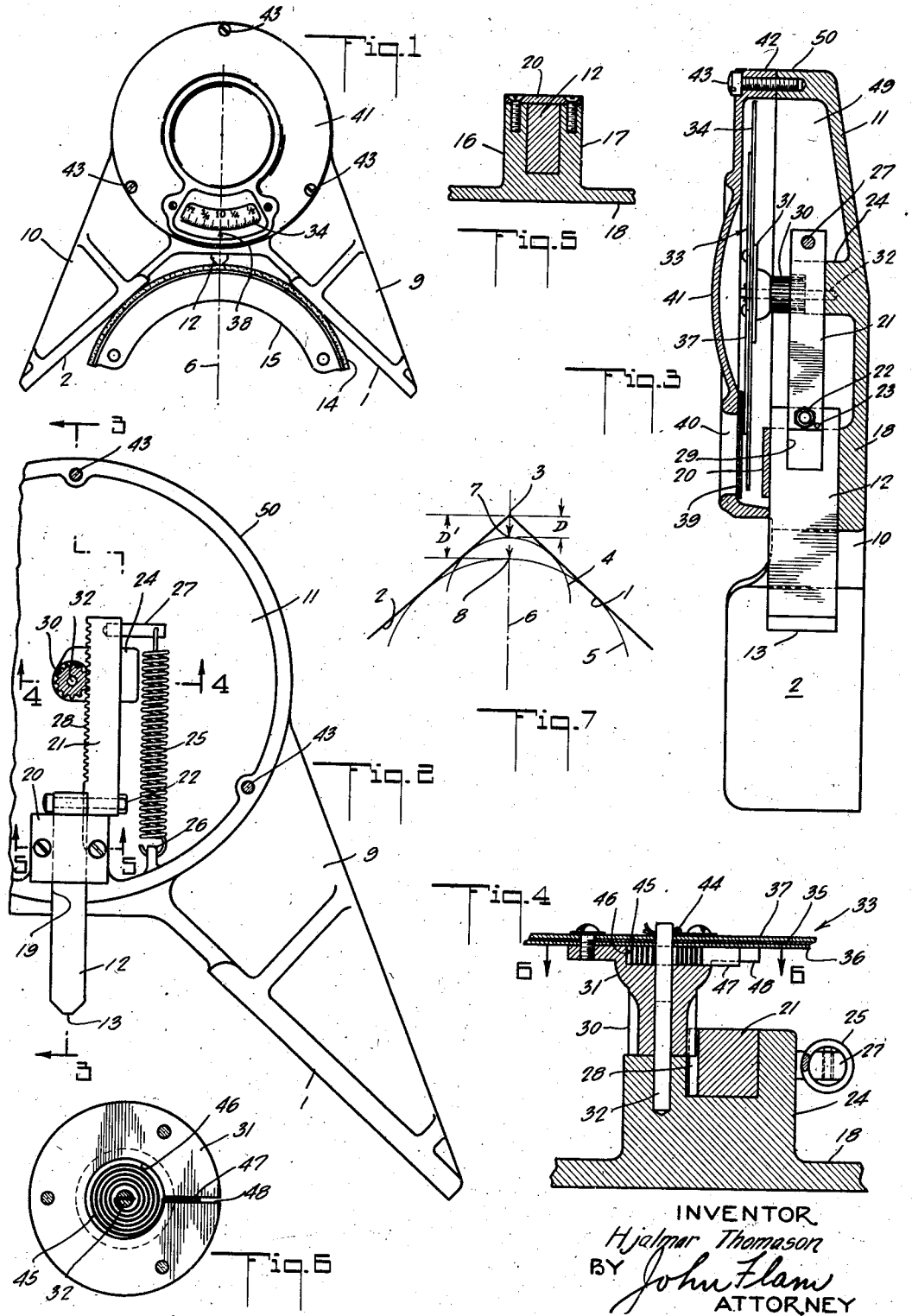
INVENTOR
Hjalmar Thomason
BY John Flam
ATTORNEY Patented Nov. 24, 1942

2,303,007

UNITED STATES PATENT OFFICE 2,303,007

GAUGE

Hjalmar Thomason, Los Angeles, Calif.

Application July 15, 1940, Serial No. 345,567

1 Claim. (Cl. 33—178)

This invention relates to a gauge, and more particularly to a gauge adapted to measure external diameters.

The use of calipers or the like for measurements of external diameters is well known, but all such methods are conditioned upon it being possible to engage diametrically opposite points of the object being measured. In many instances only an arc of a circle less than 180° is available, and such calipering methods fail. For example, it is essential to be able readily to determine the external diameter of the circle defining the braking surface of an arcuate brake shoe, or of the arcuate support for the brake lining. Such brake shoes necessarily cover much less than 180° of arc. It is accordingly one of the objects of this invention to make it possible to determine the diameter or radius of an arc of less than 180° in a simple and rapid manner.

This object is accomplished by the provision of a pair of plane surfaces placed at an angle to each other and capable of being respectively placed in tangency with points on the arc to be measured. The smaller the diameter of the arc, obviously the closer the arc can approach the place of intersection of the tangent surfaces. This feature is utilized for the gauging operation. Accordingly a movable gauging surface can be made to contact the arc on a point falling on the bisector of the angle between the planes. The position of the gauging surface when it is thus moved into contact with the arc is a function of the radius (or diameter) of the arc. The angle between the tangent surfaces determines the minimum arc that can be simultaneously placed in tangent contact with both surfaces.

It is accordingly another object of this invention to make it possible to utilize tangent plane surfaces and a movable gauging surface adapted to contact the arc, for obtaining measurements of diameters or radius.

By placing the arcuate member to be gauged in tangent relation to the surfaces and moving the member angularly, out-of-round conditions are readily detected by a corresponding movement of the gauging surface along the bisector. If the arc of the member being gauged forms an arc of a perfect circle, the position of the gauging surface does not vary.

It is accordingly another object of this invention to make it possible to detect an out-of-round condition, and to gauge the extent of departure from a perfect circular arc.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claim.

Referring to the drawing:

Figure 1 is a plan view of a gauge incorporating the invention, and shown in use;

Fig. 2 is an enlarged fragmentary view similar to Fig. 1, but with the cover removed;

Fig. 3 is a sectional view taken along plane 3—3 of Fig. 2;

Fig. 4 is an enlarged sectional view taken along plane 4—4 of Fig. 2;

Fig. 5 is a sectional view taken along plane 5—5 of Fig. 2;

Fig. 6 is a sectional view taken along plane 6—6 of Fig. 4; and

Fig. 7 is a diagram by the aid of which the mode of operation of the gauge may be described.

The gauging of external diameters of arcs of less than 180° by the aid of the apparatus hereinafter to be described, involves the use of a pair of plane surfaces 1 and 2. These plane surfaces 1 and 2 as illustrated in the diagram of Fig. 7, converge to intersect at the point 3. The angle between the plane surfaces 1 and 2 may be chosen of any suitable value. In the present instance this angle is slightly in excess of 90°.

A circular object 4 may be placed so that its external circular periphery is tangent to both of the surfaces 1 and 2. In the case of an article 5 having a diameter larger than object 4, the points of tangency are farther removed from the intersection 3. We shall now assume that a bisector 6 of the angle between the planes 1 and 2 is drawn. This bisector must pass through the center of the arc being gauged. The distance D from point 3 to the point of intersection 7 of arc of the object 4 and bisector 6 is a function of the radius or diameter of the arc. The distance D' corresponds to the length of the bisector 6 between the points 3 and 8, this latter point 8 representing the intersection of bisector 6 with the arc of article 5. The larger the arc being measured, the greater this distance becomes.

In the gauging apparatus disclosed in Figs. 1 to 6 inclusive, the plane surfaces 1 and 2 are shown as formed, as by appropriate machining, on arms 9 and 10 respectively. These arms are formed in this instance as integral portions of a cast housing 11. This housing 11 is provided with a peripheral flange 50 forming a circular recess 49 for the accommodation of parts of the apparatus.

A movable gauging member 12 having a lower contacting surface 13 is guided to slide in the direction of the bisector 6. The surface 13 is thus adapted to contact the outer periphery of the arc being gauged. In Fig. 1, the arc being gauged is formed for example by a brake liner 14 supported on an arcuate brake shoe 15.

The gauging member 12 is shown as guided for accurate movement along the bisector 6 by the aid of a pair of spaced walls 16 and 17 integral with the casing 11 and projecting from the bottom 18 thereof (Figs. 3 and 5). The flange 50 of the housing 11 is appropriately slotted as indicated at 19 (Fig. 2) for permitting the gauging member 12 to pass downwardly and out of the casing 11. A plate 20 may be fastened across the top of the walls 16 and 17 to confine the gauging member 12 against transverse movement with respect to the bisector 6.

The gauging member 12 is urged continuously by a resilient means into contact with the arcuate surface being gauged, there being stops appropriately formed within the casing 11 for limiting the motion of the gauging member 12.

There is fastened to the top of the member 12 a bar 21 of general rectangular section. (Figs. 2, 3 and 4). The gauge member 12 and the bar 21 may be fastened together as by the aid of the bolt 22. If desired, a dowel pin 23 (Fig. 3) may be utilized to maintain the gauge member 12 and the bar 21 in proper alinement. Furthermore, the lower end of bar 21 may be accommodated in a shallow slot 29 formed adjacent the upper edge of the gauge member 12. The upper end of the bar 21 is shown as guided in the boss 24 projecting from the bottom of the casing 11. The right hand and bottom faces of member 21 are plane for forming an accurate guiding surface. A tension spring 25 operates on the bar 21 to urge it downwardly. For this purpose one end of the spring 25 is anchored in the stationary anchor 26 formed on the inner surface of the flange 12 (Fig. 2). The upper end of the spring 25 is anchored to a pin 27 extending transversely of the member 21 adjacent the top thereof. The lower face of bar 21 acts as a stop against the walls 16 and 17, limiting the downward movement of the gauging member 12.

When the gauge is in the inactive position with no arcuate member being gauged, the spring 25 pulls the member 12 to the limiting position illustrated in Fig. 2. When an article such as the brake lining 14 is urged into tangent contact with surfaces 1 and 2, the surface 13 is engaged by the arcuate brake lining and the gauge member 12 is moved upwardly against the pressure of spring 25. The position of surface 13 when tangency occurs between the liner 14 and surfaces 1 and 2 is indicative of the radius or diameter of the arc being gauged.

By appropriate indicating mechanism, the position of the gauge member 12 may be caused to indicate the diameter of the arc being gauged. For this purpose movement of the bar 21 is translated into a movement of rotation. Thus the left hand edge of the bar 21 may carry gear teeth 28 forming a rack. These gear teeth engage a pinion 30. As shown most clearly in Fig. 3 this pinion 30 may be appropriately formed integrally with a flange 31 and is rotatable about a stationary stub shaft 32. This stub shaft 32 is press fitted into the boss 24. The flange 31 has fastened to it a dial structure 33 having a scale portion 34 adjacent its periphery. This scale portion may be formed on a paper facing 35 (Fig. 4) clamped between the disks 36 and 37.

The arrangement is such that between the limits of gauging movement of the member 12, the pinion 30 is given one complete revolution. The scale marks on the dial 34 are intended to cooperate with a stationary pointer 38 (Fig. 1). This pointer 38 is marked adjacent a window 39 supported beneath a viewing aperture 40 provided in a cover 41. The cover 41 may be provided with a flange 42 overlying the flange 50. The cover 41 may be fastened to the housing 11 by the aid of a plurality of screws 43. It may readily be shown that the scale diversions on the scale are uniform.

In order to restrain axial movement of the pinion 30, the stub shaft 32 may be provided at its upper end with a cotter pin 44. Furthermore, in order to eliminate any backlash between teeth 28 and pinion 30, resilient take-up means may be provided. This is shown most clearly in Figs. 4 and 6. Thus a clock spring 45 may be disposed in a recess 46 in the upper surface of the flange 31. The inner end of the clock spring is accommodated in a slot formed in the stationary stub shaft 32. Its outer end 47 extends substantially radially into a slot 48 formed radially of the flange 31. This clock spring 45 tends to rotate the pinion 30 in a clockwise direction as viewed in Fig. 6, and keeps the teeth of the pinion 30 against the upper tooth surfaces of teeth 28.

The mode of operation of the apparatus is apparent from the foregoing. When the member to be gauged is placed into the position illustrated in Fig. 1, the gauging member 12 is constrained to move along the bisector 6. The gauging surface 13 is maintained in contact with the arc to be measured by the force of the spring 25. The smaller the radius of the arc to be measured, the farther upwardly will the gauge member 12 be moved. The gauging position of Fig. 1 causes the scale 34 to asume a definite angular position and the indicated diameter can be read off through the window 39 by the aid of the pointer 38.

By moving the member 15 angularly so that different points in succession are in tangency with plane surfaces 1 and 2, an out-of-round condition can be detected. This would be indicated by movement of the dial 34.

As regards the choice of the angle between the plane surfaces 1 and 2, the larger this angle, the smaller is the arc intercepted between the points of tangency. The arcuate angle between these points forms the lower limit of the angle of the arc that can be measured. Only angles larger than that limit can be gauged. Accordingly it is advantageous to provide as large an angle between surfaces 1 and 2 as is practicable. However, larger angles between surfaces 1 and 2 have the effect of reducing the total longitudinal gauging movement of member 12.

What is claimed is:

In a gauge device of the character described, means forming a pair of plane surfaces diverging at a fixed angle, a gauging member having a gauging surface and adapted to move along a linear direction included within the angle, a dial, a rotary hub for supporting the dial, a stationary post upon which said hub is mounted, a gear carried by the hub and rotatable coaxially therewith, a rack member carried by the gauging member and cooperating with said gear, said hub having a radial slot, and a spiral spring anchored at its inner end to the post and having its outer end engaged in said slot.

HJALMAR THOMASON.